US011835219B2

(12) United States Patent
Rasmussen et al.

(10) Patent No.: US 11,835,219 B2
(45) Date of Patent: Dec. 5, 2023

(54) ILLUMINATION DEVICE WITH LIGHT SOURCE EMULATION EFFECT

(71) Applicant: HARMAN PROFESSIONAL DENMARK APS, Aarhus (DK)

(72) Inventors: Niels Jørgen Rasmussen, Egaa (DK); Claus Ellevang Hansen, Hornslet (DK)

(73) Assignee: Harman Professional Denmark APS, Aarhus N (DK)

(*) Notice: Subject to any disclaimer, the term of this patent is extended or adjusted under 35 U.S.C. 154(b) by 0 days.

(21) Appl. No.: 17/724,838

(22) Filed: Apr. 20, 2022

(65) Prior Publication Data

US 2022/0341565 A1    Oct. 27, 2022

(30) Foreign Application Priority Data

Apr. 22, 2021  (DK) .............................. PA202170183

(51) Int. Cl.
*F21V 5/00*    (2018.01)
*F21S 10/02*   (2006.01)
(Continued)

(52) U.S. Cl.
CPC ............ *F21V 5/007* (2013.01); *F21S 10/023* (2013.01); *F21V 5/04* (2013.01); *F21V 11/08* (2013.01);
(Continued)

(58) Field of Classification Search
CPC ...... F21V 5/007; F21V 5/004; F21Y 2115/10; F21Y 2105/10; F21Y 2105/12; F21Y 2113/20; G02B 6/01; G02B 19/0066; G02B 6/0028; G02B 6/005; G02B 6/0006; G02B 6/001; F21S 10/023; F21S 4/10; F21S 4/20; F21S 4/22; F21S 4/24; F21S 4/26; F21S 4/28; F21W 2131/406
See application file for complete search history.

(56) References Cited

U.S. PATENT DOCUMENTS 9,144,120 B2   9/2015 Vinther et al.
9,459,001 B2 * 10/2016 Kjaer .................... F21V 29/60
(Continued)

FOREIGN PATENT DOCUMENTS

DE    102010046571 B3   3/2012
EP         2434204 A2   3/2012
(Continued)

*Primary Examiner* — Erin Kryukova
(74) *Attorney, Agent, or Firm* — Artegis Law Group, LLP

(57) ABSTRACT

An illumination device includes a plurality of light sources arranged in at least a first group of light sources having one or more light sources and a second group of light sources having one or more light sources and further includes one or more light collectors, each being arranged for collecting light from one or more light sources from the first group of light sources and for converting the collected light into one or more light beams. The first and second groups of light sources are each individually controllable. The first and second groups of light sources are both arranged for emitting light from a space on one side of the one or more light collectors. The illumination device is arranged so that light emitted from the second group of light sources through the one or more light collectors defines a pattern comprising one or more elongated elements.

17 Claims, 7 Drawing Sheets

(51) Int. Cl.
   *F21V 5/04*     (2006.01)
   *F21V 11/08*    (2006.01)
   *F21V 19/02*    (2006.01)
   *F21Y 105/18*   (2016.01)
   *F21Y 113/20*   (2016.01)
   *F21Y 115/10*   (2016.01)
   *F21W 131/406*  (2006.01)

(52) U.S. Cl.
   CPC ....... *F21V 19/02* (2013.01); *F21W 2131/406* (2013.01); *F21Y 2105/18* (2016.08); *F21Y 2113/20* (2016.08); *F21Y 2115/10* (2016.08)

(56) References Cited

U.S. PATENT DOCUMENTS

| | | | |
|---|---|---|---|
| 2007/0041207 A1 | 2/2007 | Ishida | |
| 2012/0091917 A1* | 4/2012 | Vinther | F21V 5/048 |
| | | | 362/97.1 |
| 2019/0120447 A1* | 4/2019 | Campetella | F21V 19/001 |
| 2022/0205611 A1* | 6/2022 | Yousefi | F21V 33/0052 |

FOREIGN PATENT DOCUMENTS

| | | | | |
|---|---|---|---|---|
| EP | 2955430 A1 | 12/2015 | | |
| EP | 3392556 A1 | 10/2018 | | |
| JP | 2003245392 A | 9/2003 | | |
| KR | 20200143832 A * | 12/2020 | | |
| WO | 2010/145658 A1 | 12/2010 | | |
| WO | 2011/131200 A1 | 2/2011 | | |
| WO | 2011/131200 A1 | 10/2011 | | |
| WO | 2012/032455 A1 | 3/2012 | | |
| WO | WO-2012167800 A1 * | 12/2012 | | F21S 10/02 |
| WO | 2017/165680 A1 | 9/2017 | | |
| WO | 2020/120286 A1 | 6/2020 | | |
| WO | WO-2021079249 A1 * | 4/2021 | | F21S 4/28 |

\* cited by examiner

ILLUMINATION DEVICE WITH LIGHT SOURCE EMULATION EFFECT

CROSS-REFERENCE TO RELATED APPLICATIONS

This application claims the priority of co-pending Danish patent application titled, "Illumination Device With Light Source Emulation Effect" filed on Apr. 22, 2021 and having Serial No. PA 2021 70183. The subject matter of this related application is hereby incorporated herein by reference.

TECHNICAL FIELD

The present disclosure relates to an illumination device, and more particularly an illumination device comprising a first group of light sources, a second group of light sources and one or more light collectors, wherein light emitted from the second group of light sources through the one or more light collectors defines a pattern comprising one or more elongated elements, and furthermore relates to a method for illumination.

BACKGROUND

Illumination devices find use in several industries, e.g., in the entertainment industry for creating various light effects and mood lighting in connection with live shows, TV shows, sports events, as part of architectural installations, etc.

The illumination devices typically create the lighting effect at a distance from the illumination device itself.

There is a tendency that more and more illumination devices are used, e.g., in shows or installations, and the illumination devices consequently get more and more visible for the spectators or television viewers. Thus, also the appearance of the illumination device itself is (increasingly) relevant.

However, changing and/or improving the appearance of an illumination device, such as providing an illumination device with an aesthetic design, may be challenging since the appearance may depend on physical requirements defined by the technical specifications of the illumination device such as optics, energy consumption, mechanics, electronics, cooling, etc.

Hence, an improved illumination device, and in particular an illumination device with a changed and/or improved appearance, and a corresponding method for illumination, would be advantageous.

SUMMARY

It may be seen as an object of the present disclosure to provide an improved illumination device, and in particular an illumination device with a changed and/or improved appearance, and a corresponding method for illumination. It is a further object of the present disclosure to provide an alternative to the prior art.

So, in a first aspect the present disclosure relates to an illumination device comprising:
  a. a plurality of light sources arranged in at least:
    i. a first group of light sources, wherein the first group of light sources comprises one or more light sources, and
    ii. a second group of light sources, wherein the second group of light sources comprises one or more light sources,
    iii. wherein the first group of light sources and the second group of light sources are each individually controllable;
  b. one or more light collectors, such as one or more lenses, each being arranged for collecting light from one or more light sources from the first group of light sources and for converting the collected light into one or more light beams;
  c. wherein
  d. the first group of light sources and the second group of light sources are both arranged for emitting light from a space on one side (such as the same side) of the one or more light collectors; and
  e. the illumination device is arranged so that light emitted from the second group of light sources through the one or more light collectors, such as through the one or more light collectors through which light from the first group of light sources is also emitted, defines a pattern comprising one or more elongated elements, such as a line pattern, such as the pattern being imageable and/or observable from a position outside the illumination device and/or on the other side of the one or more light collectors with respect to the side of the one or more light collectors comprising the first group of light sources and the second group of light sources.

The LED component has as a light source changed the look of most illumination devices, e.g., due to the use of multiple LEDs to replace a single light source. One visible change is that multiple light sources may now be exposed to a viewer and the light is emitted from a larger area. Some viewers may dislike the look of multiple light dots. A previous U.S. Pat. No. 9,144,120 B2 described emitting light at an area between light beams.

Embodiments of the present disclosure may enable that an observer or an imaging device (at a position outside the illumination device and/or on the other side of the one or more light collectors with respect to the side of the one or more light collectors comprising the first group of light sources and the second group of light sources) can observe the pattern comprising one or more elongated elements through the one or more light collectors.

It may be an advantage that by having the pattern imageable and/or observable through the one or more light collectors, it may be possible to utilize an optical effect, such as a magnifying effect, of the one or more light collectors, e.g., to create astonishing signature fixture looks, such as with heritage to old incandescent lamps with visible filaments.

The disclosed embodiments may be particularly, but not exclusively, advantageous in that the pattern may appear as an intriguing and/or aesthetically pleasing, such as in particular due to the optical path from the one or more light sources in the second group of light sources and to the observer or imaging device traversing the one or more light collectors.

The disclosed embodiments may be particularly, but not exclusively, advantageous in that the one or more light collectors can be positioned and/or dimensioned so as to collect light from both the first group of light source and the second group of light sources. This may be advantageous because it enables collecting light from each of the first group of light sources and the second group of light sources, such as utilizing a large or larger portion of light from each of the first group of light sources and the second group of light sources.

The disclosed embodiments may additionally and/or alternatively, but not exclusively, be advantageous for emulating (such as appearing as or imitating) certain technical features, such as a Fresnel lens (e.g., due to the pattern comprising concentrically arranged, circular lines), incandescent bulb filaments (e.g., due to the pattern comprising helical filaments), etc. The disclosed embodiments may thus be seen as enabling replacing resource demanding components, e.g., a Fresnel lens, with less resource demanding components and then emulating their appearance so that the appearance is similar (such as not being less attractive).

The disclosed embodiments may additionally and/or alternatively, but not exclusively, be advantageous in that the elongated shape yields an opportunity of conveying information requiring elongated shapes, such as letters, or symbols, possibly relating to a status of the illumination device, such as warning messages, e.g., related to overheating. This may in turn be beneficial for saving components, e.g., for saving a separate display for warning messages and/or for yielding a cleaner appearance of the illumination device, e.g., due to omission of a separate display for warning messages. This may additionally and/or alternatively, but not exclusively, be advantageous for conveying information observable from a position in front of the illumination device, such as from a position along an axis of one or more of the one or more light collector (which may be advantageous since it allows a person being illuminated by the illumination device to have visual access to the information).

By 'illumination device' is understood as a device for providing light, such a circular beam of light with certain diameter at an optical gate and a certain (beam) angle. The illumination device may be arranged for providing one or more light beams, such as light beams with required parameters at the optical gate. In embodiments, the illumination device furthermore comprises a housing, where the light sources and the one or more light collectors are at least partially enclosed in the housing. The person skilled in (entertainment) illumination devices realizes that a number of light effects can be integrated into the illumination device. According to embodiments, there is presented a illumination device with one or more of a prism for prism effects, an iris for iris effects, framing blades for framing effects, frost filter for frost effects, means for dimming effects, animation wheel for animation effects, one or more gobo wheels. The (entertainment) illumination device can be controlled based on an input signal indicative of light parameters which can be indicative of a target color indicating a decried color of the outgoing light, a number of light effect parameters indicative of a various numbers of light effects. The (entertainment) illumination device may comprise a processor configured to control the different light effects of the illumination device based on the light parameters received by the input signal. For instance the (entertainment) illumination device may comprise the light effects and be controlled based on various parameters as described in WO2010/145658 in particular on page 4 line 11-page 6 line 9, which is incorporated by reference herein.

A 'light source' is understood as is common in the art, and may generally be an electric light source converting electrical power into luminous flux, such as a solid-state light source, such as a Light Emitting Diode (LED) (such as a converted LED, such as a phosphor converted LED) or a LASER (such as LASER Activated Remote Phosphor (LARP) light source). It is encompassed that a light source can comprise an optical element, such as an optical element (such as a light guide, such as a side-emitting light guide, or a slit) changing the position and/or direction from which light is emitted and/or changing a pattern from which light is emitted, such as changing how an observer will observe light emitted, such as will observe light emitted from a different position and/or direction (e.g., due to a light guide) and/or emitted in a different pattern (e.g., due to a slit and/or a light guide), such as compared to a situation without the optical element, such as compared to a situation with the light source consisting of an emitter.

A '(light) emitter' is understood to be an element wherein or at which photons are generated, such as an LED or LASER, such as not including an (optional) optical element. 'Light emitter(s)' is used interchangeably with 'emitter(s)' within the present application.

When referring to a 'position' of a light source and/or a 'distance' (such as a center-to-center distance) between light sources in the present application, it is understood to be with reference to a part of the light source(s) from which light is emitted towards, such as directly towards (such as following a straight line towards), the light collector. For example, in case of light source comprising an emitter and a light guide with the emitter placed at a position not visible through the one or more light collectors (e.g., behind a backdrop) and emitting light into a light guide, which light guide in turn emits light at a position visible through the one or more light collectors, the position of the light source is considered to be the (exit-) position of the light guide, and a (center-to-center-)distance from the light source is to be measured from a (center-)position at the (exit-)position of the light guide.

The number of light sources in the plurality of light sources may be at least 3, such as at least 4, such as at least 5, such as at least 10, such as at least 19, such as at least 20, such as at least 40, such as at least 60, such as at least 80, such as at least 100, such as 120 or more. The first group of light sources may comprise a plurality of light sources, such as at least 3, such as at least 4, such as at least 5, such as at least 7, such as at least 10, such as at least 20, such as at least 40, such as at least 60, such as at least 80, such as at least 100, such as 120 or more, and/or the second group of light sources may comprise a plurality of light sources, such as at least 3, such as at least 4, such as at least 5, such as at least 6, such as at least 7, such as at least 10, such as at least 12, such as at least 20, such as at least 40, such as at least 60, such as at least 80, such as at least 100, such as 120 or more. In an embodiment the first group of light sources comprises, such as consists of, 7 light sources and/or the second group of light sources comprises, such as consists of, 12 light sources.

'Light' is generally understood to be visible electromagnetic radiation, such as electromagnetic radiation with wavelengths within (both endpoints included) 380-780 nm.

'The first group of light sources and the second group of light sources are each individually controllable' may be understood to mean that each of the first group of light sources and the second group of light sources can be controlled without the other group of light sources being controlled in a similar manner, such as each of the first group of light sources and the second group of light sources being possibly controlled individually and independently of the other group of light sources. By 'controllable' may be understood that one or more light parameters, such as color of and/or luminous flux from a group of light sources, can be controlled.

A 'light collector' may be understood to be an optical component or system capable of redirecting light, such as receiving (collecting) light having a direction and reemitting light in another direction, such as having non-zero optical power (such as having a focal length being less than 10 m, such as being less than 1 m, such as less than 10 cm), such as comprising one or more (refractive) lenses, such as one or more Total Internal Reflection (TIR) lenses, and/or (reflecting) catoptrics, such as one or more catopters (catoptric systems). The 'light collector' may in particular be arranged for providing diverging, collimated or converging light, such as arranged for receiving light with a certain (optionally wide) angle, such as within ±90°, from the light sources and reemitting (such as reemitting on the opposite side of the light collector with respect to the side where light is received) a beam with a different angle, such as with a positive (diverging) angle (such as at least 1°, such as at least 2°, such as at least 5°), a substantially zero angle (such as within ±15°, such as within ±10°, such as within ±5°, such as within ±3°, such as within ±2°, such as within ±1°), such as a negative (converging) angle (such as less than −1°, such as less than −2°, such as less than)−5°. The light collector may comprise a number of lenslets each collecting light from one of the light sources within the first group of light sources and converting the light into a corresponding light beam or the light collector also can be embodied as a single optical lens.

A 'lenslet' may be understood to be a lens (of any size, and optionally small) in an array.

'Light beam' is understood as is common in the art, to refer to a directional projection of light energy radiating from a light source. A light beam may be understood to have a divergence angle (beam divergence) being equal to or less than 90°, such as equal to or less than 45°, such as equal to or less than 30°, such as equal to or less than 15°, such as equal to or less than 10°, such as equal to or less than 5°, such as being collimated (such as collimated being equal to or less than 3°, such as being substantially 0°, such as being 0°).

'A space on one side of the one or more light collectors' is understood to mean that both of the first group of light sources and the second group of light sources are arranged for emitting light from a space on one side, i.e., the same side, of the one or more light collectors, such as also emitting light onto the same side of the one or more light collectors.

'Light emitted from the second group of light sources through the one or more light collectors defines a pattern' is understood to mean that light having traversed the one or more light collectors define a pattern, such as the pattern being imageable and/or observable from a position outside the illumination device and/or on the other side of the one or more light collectors with respect to the side of the one or more light collectors comprising the first group of light sources and the second group of light sources. For example, the pattern may be observed on an image taken with a camera from a position at a distance from the illumination device.

It may for example be understood that each of the first group of light sources and the second group of light sources are observable and/or imageable through the one or more light collectors, such as through the same one or more light collectors. For example, first group of light sources may be arranged with the one or more light collectors to create light beams and the second group of light sources may be arranged with the one or more light collectors to be observable and/or imageable though the one or more light collectors, such as making a candescent filament emulation pattern, which is visible through the one or more light collectors, such as the one or more light collectors, which together with first group of light sources is arranged to create light beams.

'A pattern comprising one or more elongated elements' may be understood to mean a pattern wherein at least some features, such as a sub-part of the pattern, is an elongated element. For example, the pattern can be a line pattern, such as a pattern with lines.

An 'elongated element' is understood to be an element, such as a part of the pattern, such as a feature in the pattern, wherein an aspect ratio exceeds 10, such as exceeds 20, such as exceeds 50, such as exceeds 100. For example, a feature in the pattern could be a line, having a length being 10 times larger than its thickness, such as 20, 50 or 100 times larger than its thickness.

For example, the pattern can comprise a straight line with a length being more than 10 times its thickness. In an alternative, it is also understood that, e.g., the line of an open circle with a circumference being more than 10 times the line width would also be encompassed as an elongated element.

In embodiments, the light sources within the first group of light sources are non-elongated, such as having an aspect ratio being less than 10, such as less than 5, such as less than 2, such as substantially 1, such as 1 (such as round or square shaped).

An 'observer' is generally understood to be an observer in a position outside the illumination device and/or on the other side of the one or more light collectors with respect to the side of the one or more light collectors comprising the first group of light sources and the second group of light sources, such as on an optical axis of one or more light collectors, such as on an optical axis of a central light collector.

In an embodiment, the illumination device comprises a plurality of light sources in each of the first group of light sources and the second group of light sources and a center-to-center distance between light sources within the first group of light sources is at least 5 cm, such as at least 10 cm, such as at least 20 cm.

It is understood that a maximum luminous flux from the first group of light sources is at least 10 times larger, such as at least 100 times larger, such as at least 500 times larger, such as at least 1000 times larger, than a maximum luminous flux from the second group of light sources and/or that the illumination device is arranged so that a maximum luminous flux from the first group of light sources is at least 10 times larger, such as at least 100 times larger, such as at least 500 times larger, such as at least 1000 times larger, than a maximum luminous flux from the second group of light sources. A maximum luminous flux of the first group of light sources is at least 1000 lm (lumen), such as at least 2000 lm, such as at least 5000 lm, such as at least 10000 lm.

In an embodiment, a maximum power consumption of the illumination device is at least 50 W (Watts), such as at least 100 W, such as at least 200 W, such as at least 500 W, such as at least 1000 W, such as at least 1500 W.

In embodiments, the illumination device comprises a plurality of light sources in the second group of light sources, and each of the first group of light sources and the second group of light sources comprises one or more LEDs, and a center-to-center distance between light sources within the first group of light sources is at least 5 cm, such as at least 10 cm, such as at least 20 cm, and the illumination device is arranged so that a maximum luminous flux from the first group of light sources is at least 10 times larger, such as at least 100 times larger, such as at least 500 times larger, such as at least 1000 times larger, than a maximum luminous flux from the second group of light sources.

In embodiments, the illumination device can be a wash/flood illumination device, such as capable of creating a relatively wide light beam with a uniform light distribution, or it can be a profile illumination device capable of projecting image onto a target surface.

According to an embodiment, there is presented an illumination device, wherein the illumination device is arranged so that the light which defines the pattern is emitted from the second group of light sources through the one or more light collectors through which light from the first group of light sources is also emitted.

A possible advantage of this might be that it enables integration of parts, e.g., having one or more light collectors double functioning as light collector(s) for each of the first and second group of light sources. Another possible advantage is that a more aesthetically pleasant look is provided, such as a less cluttered look. Another possible advantage is that a better view to the first group of light sources and/or the second group of light sources is provided, e.g., due to fewer borders between light collectors (such as between light collectors for the first- and second group of light collectors). Another possible advantage might be that each of the one or more light collectors can be made larger, and thus optionally more efficient.

According to an embodiment, there is presented an illumination device, wherein the elongated shape is given by:
  a. an elongated shape of light emitters within the second group of light sources, such as the second group of light sources being a selected set of light sources from a larger set of light sources (wherein the larger set of light sources, such as a two-dimensional LED or organic LED (OLED) array which may or may not be elongated), and/or
  b. an elongated shape of one or more optional optical elements between the light emitters within the second group of light sources and the one or more light collectors and through which some or all of light emitted from the light emitters within the second group of light sources travel, such as one or more light guides and/or one or more optical slits.

By having the elongated shape being given by an elongated shape of the second group of light sources it may be possible to provide the shape, e.g., with a shape of a single light source, such as a filament or a side-emitting light fiber, or with a plurality of light sources, such as a series of adjacent or adjoining (optionally non-elongated, such as square or round) light sources, such as pixels.

By having the elongated shape being given by an elongated shape of one or more optical elements it may be possible to provide the shape, e.g., with a shape of a slit. This may be beneficial, e.g., for lessening the requirements to the light source, which may, e.g., make the illumination device and/or spare parts less costly.

According to an embodiment, there is presented an illumination device, wherein the elongated shape is given by:
  a. one or more coherent elongated elements, such as
    i. one or more coherent, elongated light emitters within the second group of light sources, and/or
    ii. one or more optional coherent, elongated optical elements between light emitters within the second group of light sources and the one or more light collectors and through which some or all of light emitted from the light emitters within the second group of light sources travel, and/or
  b. an arrangement of light sources within the second group which arrangement forms a line (such as a tracing line), such as wherein a center-to-center distance between neighboring light sources within the second group of light sources is less than half (½ times) a minimum center-to-center distance between light sources within the first group of light sources, such as equal to or less than ⅕, such as equal to or less than 1/10, such as equal to or less than 1/20, such as equal to or less than 1/50, such as equal to or less than 1/100, times a minimum center-to-center distance between light sources within the first group of light sources wherein the first group of light sources comprises a plurality of light sources.

A possible advantage of having one or more coherent, elongated light sources within the second group of light sources may be that it provides a simple way of establishing the pattern comprising one or more elongated elements. A possible advantage of having one or more optional coherent, elongated optical elements between the second group of light sources and the one or more light collectors and through which some or all of light emitted from the second group of light sources travel may be that it provides a simple way of establishing the pattern comprising one or more elongated elements, which may optionally allow use of non-elongated light sources (because the pattern is created by the optical elements).

A possible advantage of having an arrangement which forms a line, may be that it enables utilizing a plurality of non-elongated light sources and/or optical elements, which, however, is arranged so as to form a line.

In embodiments, a center-to-center distance between neighboring light sources within the second group of light sources (such as within such a line) may be less than 10 mm, such as less than 5 mm, such a less than 1 mm.

According to an embodiment, there is presented an illumination device, wherein the second group of light sources comprises:
  a. one or more light emitting strings, such as the light emitting strings being visible through the one or more light collectors.

A possible advantage of light emitting strings may be that they provide a simple way of establishing the pattern comprising one or more elongated elements.

A 'light emitting string' may be understood to be an elongated element arranged for emitting light from an elongated area.

The 'light emitting string' may comprise an elongated light source and/or a plurality of light sources which together form an elongated area from which light is emitted. For example, a light emitting string may be comprising a plurality of light sources arranged in a line, such as being closed spaced (such as with a distance between neighboring lights sources being less than 10 mm, such as less than 5 mm, such as less than 1 mm) with respect to each other.

Additionally or alternatively, a light emitting string may comprise an optical element, such as a slit which can block light so as to emit light only from an elongated area and/or a light guide which can take as input light from a non-elongated light source, such as a point light source or a square shaped or round LED, and (re-)emit the light from an elongated area.

According to an embodiment, there is presented an illumination device, wherein the illumination device is arranged for having arranged each light source within the first group of light sources in a pair with a light collector, such as each light source within the first group of light sources is arranged for emitting light into a light beam exiting the illumination device from a unique light collector (such as the number of light sources within the first group of light sources being identical to the number of light beam collectors), such as one and only one light beam per light collector and/or one and only one light source from the first group of light sources per light collector, such as wherein there is a plurality of light collectors gathered in an assembly such as a lens assembly, such as a front lens assembly.

A possible advantage of having arranged each light source within the first group of light sources in a pair with a light collector may be that it enables optimizing each of the light collectors to collect and (re-)transmit light from the corresponding light source with the first group of light sources.

In an embodiment, there is a plurality of light sources within the first group of light sources and a (corresponding) plurality of light collectors, and optionally each of the light sources within the first group of light sources is intersected by an optical axis of a light collector.

Light emitted form the second group of light collectors may be emitted to an observer, such as an observer outside of the illumination device, through a point on the same side of the light collector as (such as facing) the light source from the first group of light sources, which point is on the optical axis of the light collector.

A 'front lens assembly' is understood to be a lens assembly which is the last lens assembly, such as the last optical component, traversed by light emitted from the light sources before the light exits the illumination device.

According to an embodiment, there is presented an illumination device, wherein the illumination device comprises a controller adapted to individually control each of the first group of light sources and the second group of light sources.

According to this embodiment the first group of light sources and the second group of light sources may each be controlled individually and optionally independently via the controller. The controller may thus be adapted to treat the two groups of light sources as at least two individual light sources which can be individually controlled. However the skilled person realizes that the illumination device also can be adapted to divide each group of light sources into a number of subgroups which also can be controlled individual and that it is also possible to arrange the illumination device so that each single light source can be controlled individually. The controller may receive an input signal from an external unit as known in the art of intelligent and entertainment lighting for instance by using a standard protocol, such as DMX, ArtNET or RDM.

According to an embodiment, there is presented an illumination device, wherein the illumination device comprises a controller adapted to individually control individual light sources in at least one of the groups of light sources. A possible advantage is that this may yield a greater degree of control, e.g., for the purpose of controlling color and/or for providing effects.

According to an embodiment, there is presented an illumination device, wherein the illumination device further comprises a backdrop arranged on the same side of the one or more light collectors as the second group of light sources and at the same or larger distance with respect to the one or more light collectors as the second group of light sources.

According to an embodiment, there is presented an illumination device, wherein the illumination device further comprises a backdrop arranged so that the second group of light sources is placed between the one or more light collectors and the backdrop.

A 'backdrop' is understood as is common in the art, to refer to an element covering technical installations being placed on the opposite side of the backdrop with respect to the second group of light sources. A possible advantage may be that the illumination device takes on an aesthetically more pleasant appearance, such as with a cleaner look, and/or that less effort has to be spent in designing the technical installations so as to appear pleasantly.

According to an embodiment, there is presented an illumination device, wherein the backdrop has variations in texture, topography and/or optical properties. By variations in texture topography may be understood variations in material, such as smoothness, roughness, or bumpiness of the surface (facing the second group of light sources) of the backdrop. By variations in topography may be understood topographical variations, such as depressions and/or protrusions, such as grooves (or troughs or valleys) and/or ridges. By variations in optical properties, may be understood any variation being observable upon being illuminated, such as variations in color, direction of reflected light, and/or reflectivity coefficient. An advantage of the variations may be that they enable emulating technical structures, such as a Fresnel lens, which may dispense with a need of actually providing the technical structures. An advantage of the variations may be that they may provide and/or amplify an aesthetically pleasant appearance, such as amplify an appearance of an incandescent Fresnel lamp.

According to an embodiment, there is presented an illumination device, wherein the backdrop is designed with circular V-grooves optionally being concentrically arranged with respect to an optical axis of at least one light collector within the one or more light collectors, such as to emulate a Fresnel lens look. An advantage may be that it enables providing an appearance of a Fresnel lens without actually having to provide a Fresnel lens.

According to an embodiment, there is presented an illumination device, wherein the illumination device further comprises a third group of light sources, the third group of light sources is arranged for backlighting the backdrop and the backdrop, such as wherein the backdrop is placed between the third group of light sources and the one or more light collectors and/or wherein the backdrop is substantially translucent and diffuses the light. A possible advantage of this may be that it enables providing a more homogeneously illuminated and/or illuminating surface of the illumination device, such as opposed to a "dotted" look of an illumination device merely comprising a plurality of "isolated" LED sources from which light is emitted.

'Backlighting' is understood to refer to emitting light from the backside (i.e., the space on the backside) of the backdrop and towards the backside (i.e., the side of the backdrop on backside), where the backside of backdrop is the side facing away from the one or more light collectors.

According to an embodiment, there is presented an illumination device, wherein the one or more light emitting strings comprise one or more light guides illuminated from one or more emitters within the second group of light sources. Light guides, such as elongated light guides are, understood as common in the art. Examples of elongated light guides are described in U.S. Pat. No. 9,144,120 B2, which is hereby incorporated by reference in entirety, and in particular in FIGS. 6a-b and the corresponding description, such as the description col. 6, 1. 48-67, which figures and corresponding description is hereby incorporated by reference.

A possible advantage may be that a light guide may take as input light from a non-elongated light source, such as a point light source or a square shaped or round LED, and (re-) emit the light from an elongated area.

According to an embodiment, there is presented an illumination device, wherein the light emitting strings are LED filament strings. An LED filament string may be understood as a 'light emitting string' comprising LED light sources. An LED filament may comprise multiple series-connected LEDs on a (optionally transparent) substrate, such as referred to as chip-on-glass (COG). These (optionally transparent) substrates can be made of glass or sapphire materials. E.g., due to transparency the emitted light may be allowed to disperse evenly and uniformly without any interference. An LED filament may additionally comprise a coating, such as an even coating, such as a coating comprising yellow phosphor in a silicone resin binder material. which converts the blue light generated by the LEDs into light approximating white light of the desired color temperature—typically 2700 K to match the warm white of an incandescent bulb.

According to an embodiment, there is presented an illumination device, wherein the light emitting strings are merged or positioned into an (front lens) assembly comprising the one or more light collectors. A possible advantage may be that it simplifies construction of the illumination device, such as via integration of parts, wherein the one or more light collectors are placed together.

According to an embodiment, there is presented an illumination device, wherein the illumination device is a moving head.

A 'moving head' is understood to be an illumination device comprising means for rotation of the illumination device about one or more axis of rotation, such as arranged for rotation around two axes of rotation, such as arranged for rotation around three axes of rotation. By arranged for rotation around an axis, may be understood that the illumination device comprises two parts (such as an illuminating part and a holding part) which are connected by a rotatable joint and wherein the illumination device furthermore comprises a driving means, such as a motor, for rotating one of the parts relative to the other part. The moving head (illumination device) may be arranged for being rotatable around a plurality of axes which may be realized by providing further parts with rotatable joints and driving means as is known in the art.

According to a second aspect of the disclosure there is presented a method of illumination, the method comprising
a. providing an illumination device according to the first aspect, and
b. emitting light from the first group of light sources and/or from the second group of light sources.

The first and second aspects of the disclosure may each be combined with any of the other aspects. These and other aspects of the disclosure will be apparent from and elucidated with reference to the embodiments described hereinafter.

BRIEF DESCRIPTION OF THE DRAWINGS

The first and second aspects of the disclosure are now described in more detail with regard to the accompanying figures. The figures show one way of implementing the present embodiments and is not to be construed as being limiting to other possible embodiments falling within the scope of the attached claim set.

DETAILED DESCRIPTION

Figure 1:
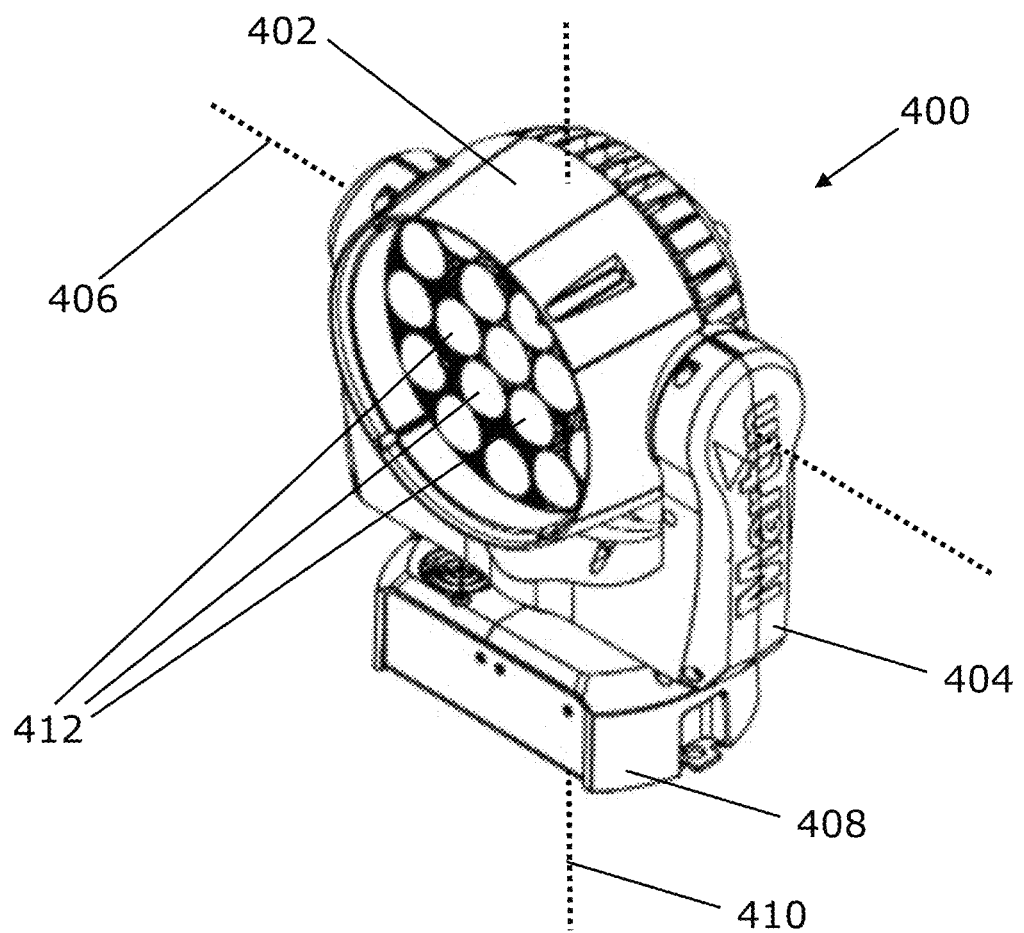
FIG. 1 shows a perspective view illustration of an example of a rotatable (moving head) illumination device.

FIG. 1 shows an example of a rotatable (moving head) illumination device 400, comprising an illumination part 402 comprising the first group of light sources (not shown) and the second group of light sources (not shown) and a plurality of light collectors 412 (being lenslets arranged in an array), a yoke 404 whereupon the illumination part 402 is rotatably mounted for rotation around axis 406 upon being driven by a driving means, such as a motor (not shown) in yoke 404, and a base 408 whereupon the illumination part yoke 404 (and thus the illumination part 402) is rotatably mounted for rotation around axis 410 upon being driven by a driving means, such as a motor (not shown) in base 408.

Figure 2:
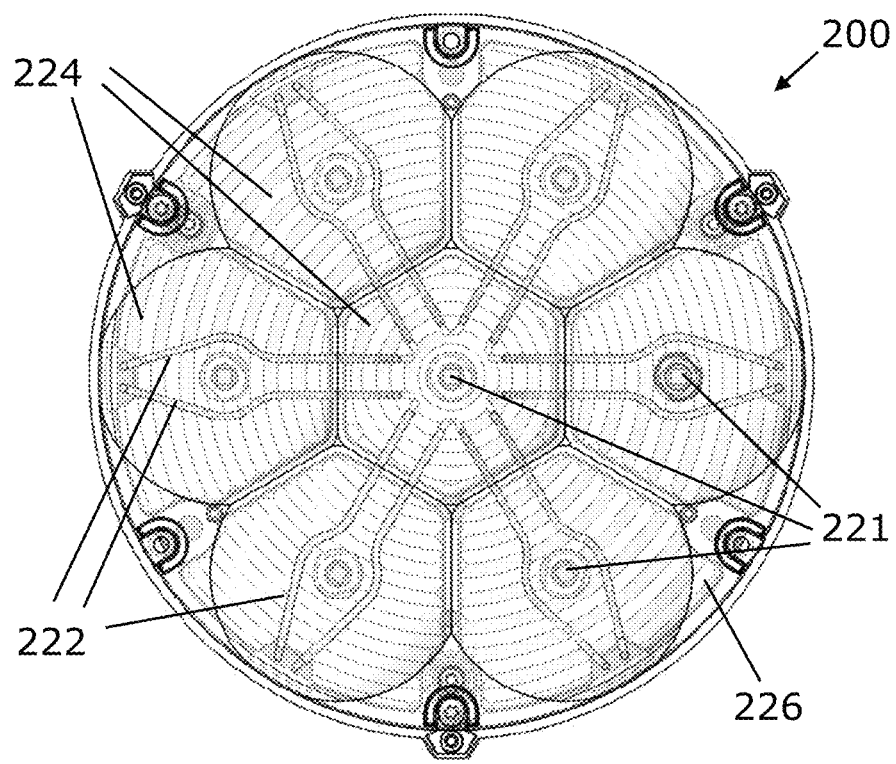
FIG. 2 shows a front view of a part of an embodiment of an illumination device.

FIG. 2 shows a front view of a part of an embodiment of an illumination device comprising seven non-elongated LED light sources within a first group of light sources 221, 12 light sources within a second group of light sources 222, seven light collectors 224 (being lenslets arranged in an array) each being arranged for collecting light from a light source from the first group of light sources 221 and for converting the collected light into one or more light beams and furthermore each being arranged for collecting light from two or more light source from the second group of light sources 222 and for conveying the collected light to an observer being placed on the other side of the one or more light collectors with respect to the side of the one or more light collectors comprising the first group of light sources and the second group of light sources, and a backdrop 226 comprising concentrically arranged (with respect to the central light source in the first group of light sources), V-shaped grooves.

The light sources in the second group of light sources 222 are elongated, side-emitting light guides (such as those depicted in FIG. 6*b* in the U.S. Pat. No. 9,144,120 B2), and the illumination device 200 is arranged so that light emitted from the second group of light sources 222 through the light collectors 224 define a pattern comprising a plurality of elongated elements, which in the present case is a line pattern, as observable from the observers position for the present figure, which corresponds to a position outside the illumination device 200 and on the other side of the light collectors 224 with respect to the side of the light collectors comprising the first group of light sources 221 and the second group of light sources 222 (which would be on the other side of the light collectors with respect to the position of the observer). The order of the elements is also apparent from FIG. 3.

Figure 3:
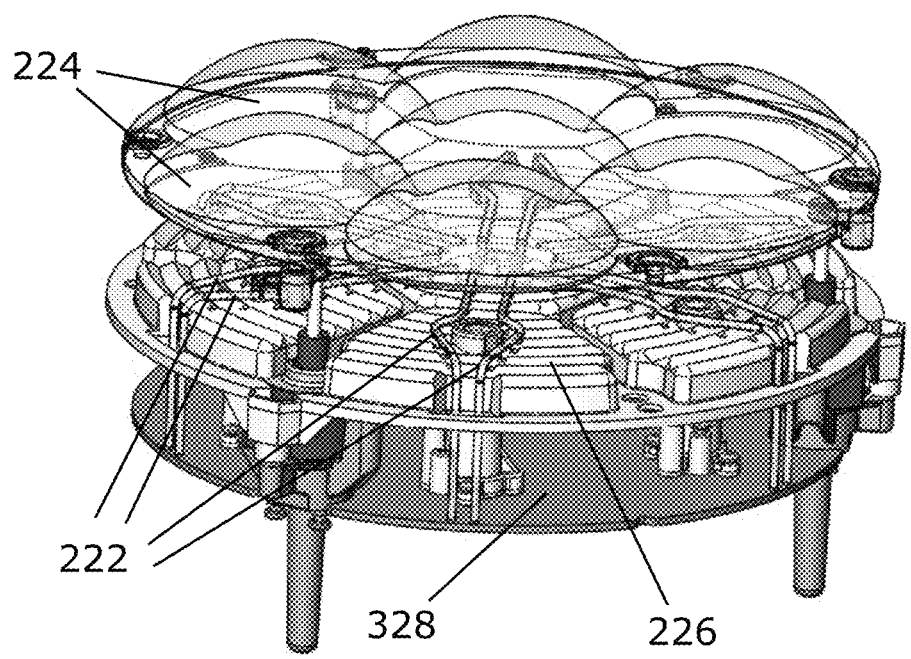
FIG. 3 shows a perspective view of a part of an embodiment of an illumination device.

FIG. 3 shows a perspective view of a part of the embodiment of an illumination device depicted in FIG. 2, where the order of the elements in FIG. 2 appear. Furthermore, FIG. 3 depicts a printed circuit board (PCB) 328 onto which the light sources in the first group of light sources are mounted and it is understood that light from the first group of light sources 221 passes through openings in the backdrop 226 on its way towards the light collectors. The second group of light sources 222 are arranged between the backdrop 226 and the light collectors 224 (but light may enter into the light sources in the second group of light sources 222 from a position on the opposite side of the backdrop 226 with respect to the light collectors 224).

Figure 4:
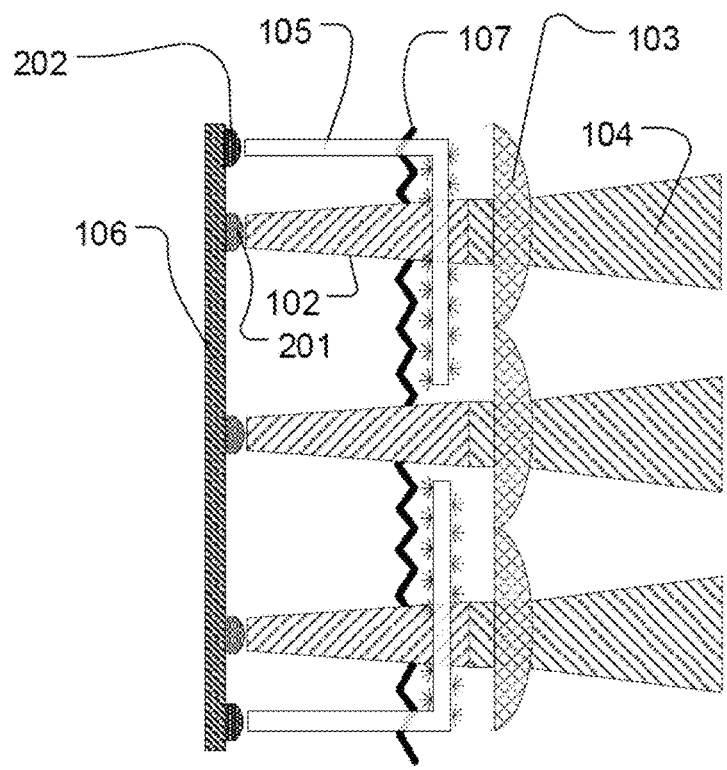
FIG. 4 shows a schematic section cut of the embodiment shown in FIGS. 2-3, FIG. 5-10 show schematic section cuts of alternative embodiments of illumination devices.

FIG. 4 shows a schematic section cut (or cross-sectional view) of an embodiment similar to the embodiment shown in FIGS. 2-3, comprising a PCB 106 whereupon is mounted light emitters 201 (such as a 4-in-1 RGBW LED which comprises a red die, green die, blue die and a white die) which together with light collecting means 102 (which are adapted to collect and mix the light from light emitters 201) and wherein light emitters 201 and light collecting means 102 together form light sources within the first group of light sources. The embodiment furthermore comprises light emitters 202 (such as LEDs) mounted on the PCB 106 and side emitting light guides 105, wherein the light emitters 202 and side-emitting light guides 105 together form light sources within the second group of light sources. The embodiment still further comprises light collectors 103, which in the present embodiment is refractive lenslets arranged in an array, each lenslet being arranged for collecting light from a light source from the first group of light sources and for converting the collected light into a light beam 104. The first group of light sources and the second group of light sources are both arranged for emitting light from a space on one side of the one or more light collectors, i.e., the left side of the lenslets 103 in the present figure. The illumination device is arranged so that light emitted from the second group of light sources through the one or more light collectors defines a pattern comprising one or more elongated elements, such as the pattern being imageable and/or observable from a position outside the illumination device and/or on the other side of the one or more light collectors with respect to the side of the one or more light collectors comprising the first group of light sources and the second group of light sources, i.e., on the right side of the lenslets 103 in the present figure. The figure furthermore shows a backdrop 107 with V-shaped grooves.

Figure 5:
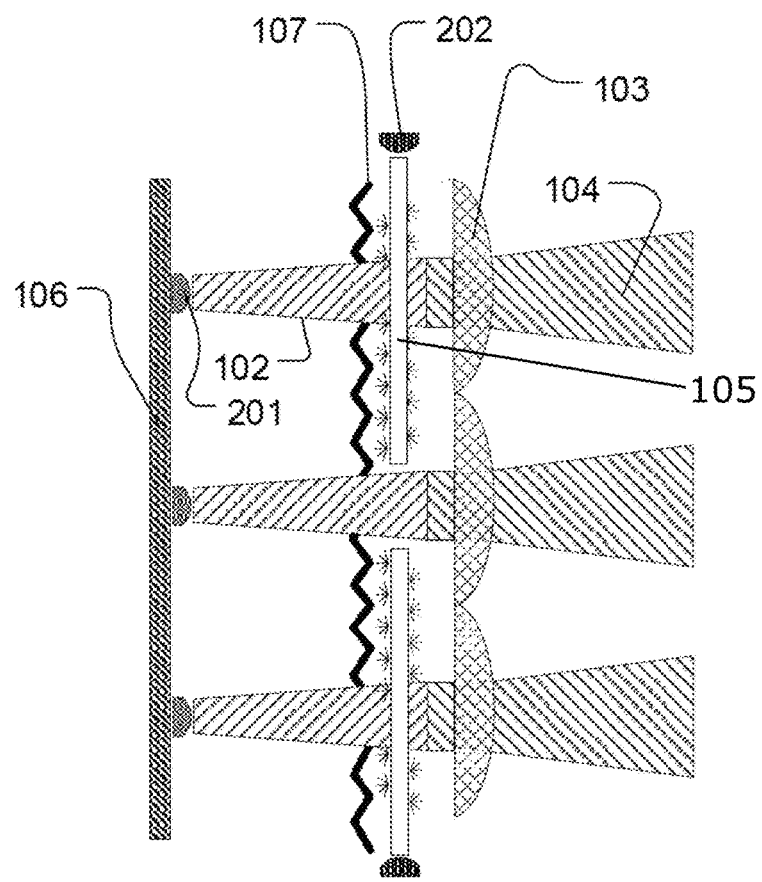

FIG. 5 shows a schematic view of an embodiment similar to the embodiment shown in FIG. 4, except that the light emitters 202 and side-emitting light guides 105 are arranged differently and more particularly the side light emitters 202 are placed in a plane between the light collectors 103 and the backdrop 107 and emit light in a direction orthogonal to an optical axis of the light collectors and the side-emitting light guides 105 are guiding light (only) within the plane, i.e., they do not comprise a portion bending light from a direction parallel with an optical axis of the light collectors 103 and into the plane.

Figure 6:
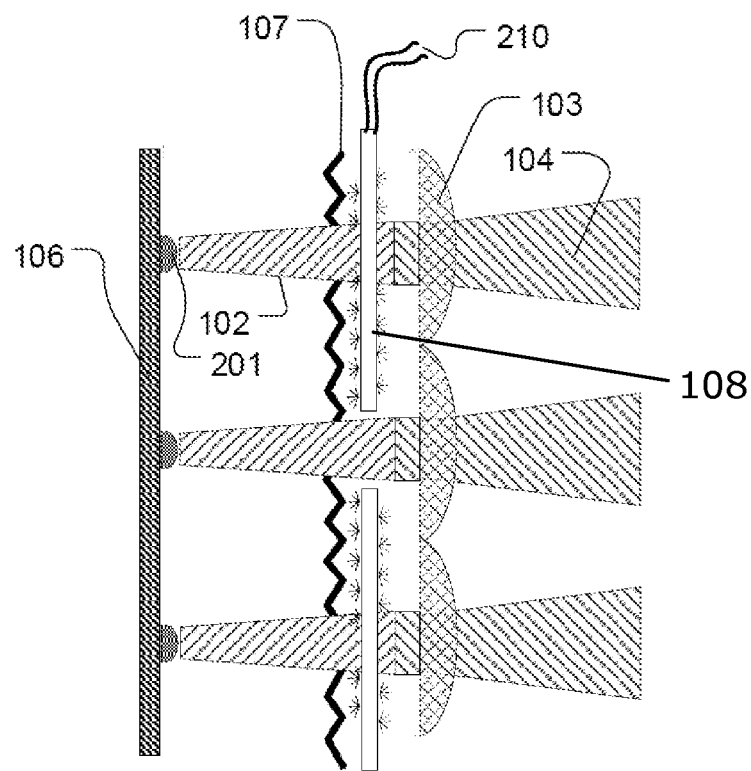

FIG. 6 shows a schematic view of an embodiment similar to the embodiment shown in FIG. 5, except that the light emitters 202 and side-emitting light guides 105 in FIG. 5 have been replaced with LED filaments 108 with electrical connections 210.

Figure 7:
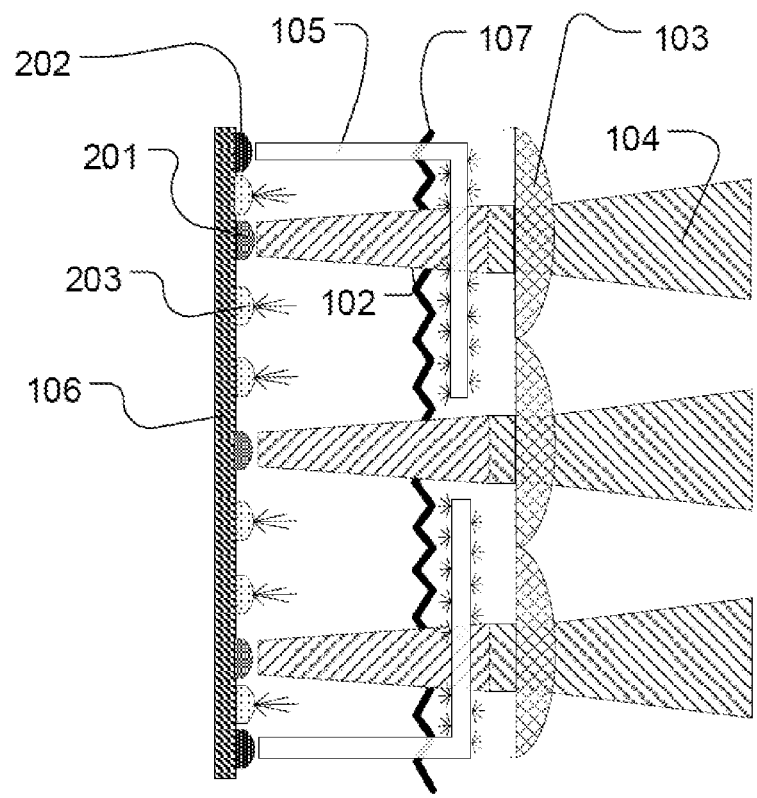

FIG. 7 shows a schematic view of an embodiment similar to the embodiment shown in FIG. 4, except that the embodiment depicted in FIG. 7 furthermore comprises light sources within a third group of light sources 203 mounted on the PCB 106, which backlights the backdrop 107, i.e., from a position on the side of the backdrop 107 opposite the one or more light collectors 103 emits light onto the backdrop.

Figure 8:
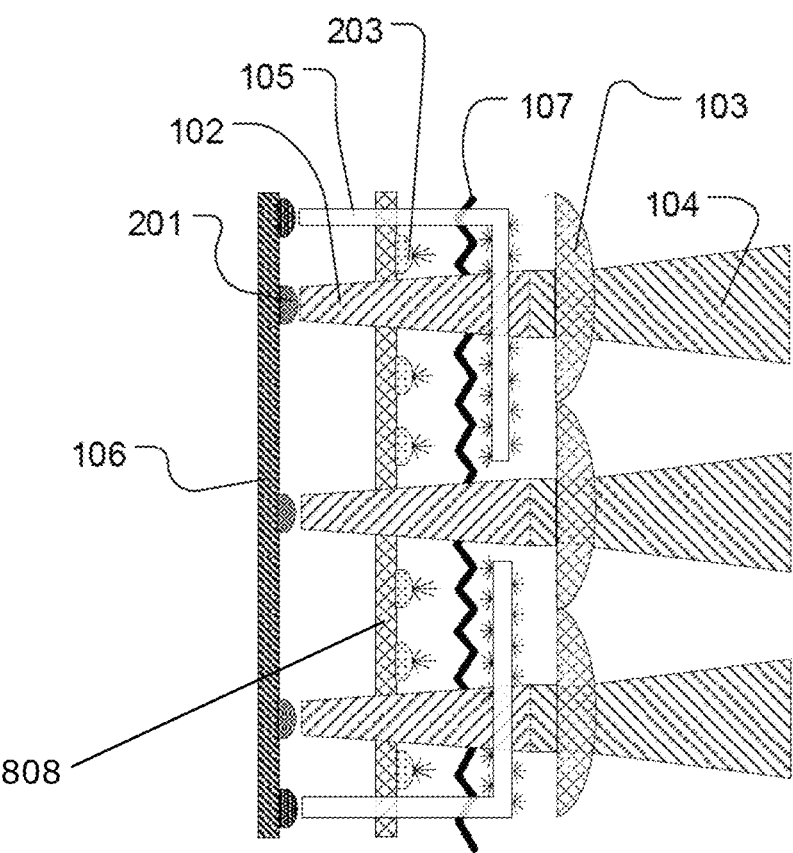

FIG. 8 shows a schematic view of an embodiment similar to the embodiment shown in FIG. 7, except that in the embodiment depicted in FIG. 8, the third group of light sources 203 are placed on a separate PCB 808 (with respect to PCB 106 upon which is mounted light emitters 201).

Figure 9:
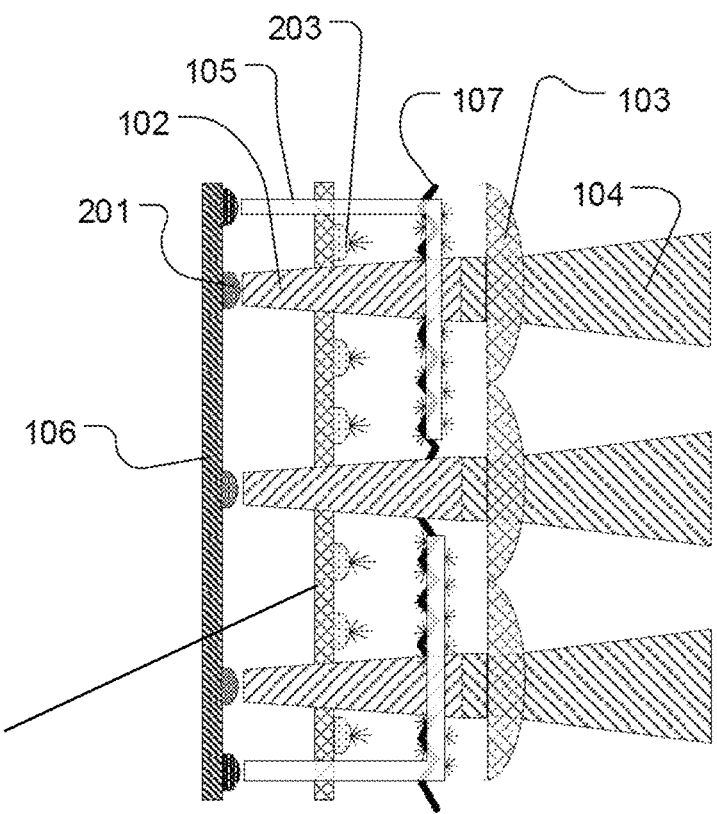

FIG. 9 shows a schematic view of an embodiment similar to the embodiment shown in FIG. 8, except that in the embodiment depicted in FIG. 9, the backdrop 107 and the portion of the light sources within the second group of light sources 105 from which light is emitted is in substantially the same plane, such as the same plane, i.e., in the same plane being a plane which is orthogonal to an optical axis of the one or more light collecting means 103.

Figure 10:
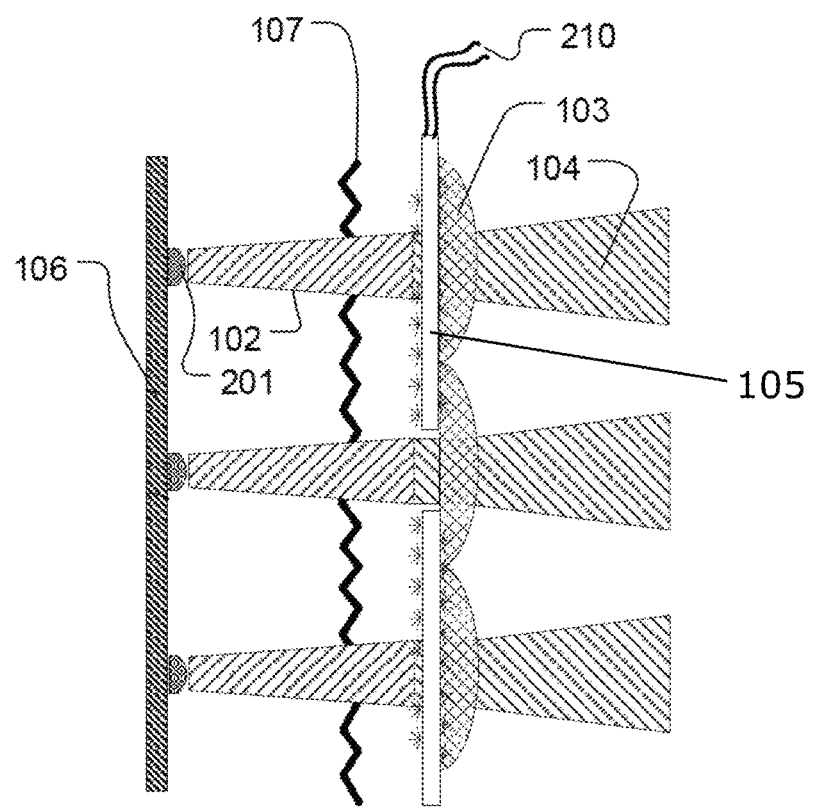

FIG. 10 shows a schematic view of an embodiment similar to the embodiment shown in FIG. 6, except that in the embodiment depicted in FIG. 10, the light emitting strings are merged or positioned into an assembly comprising the one or more light collectors 103.

Figure 11:
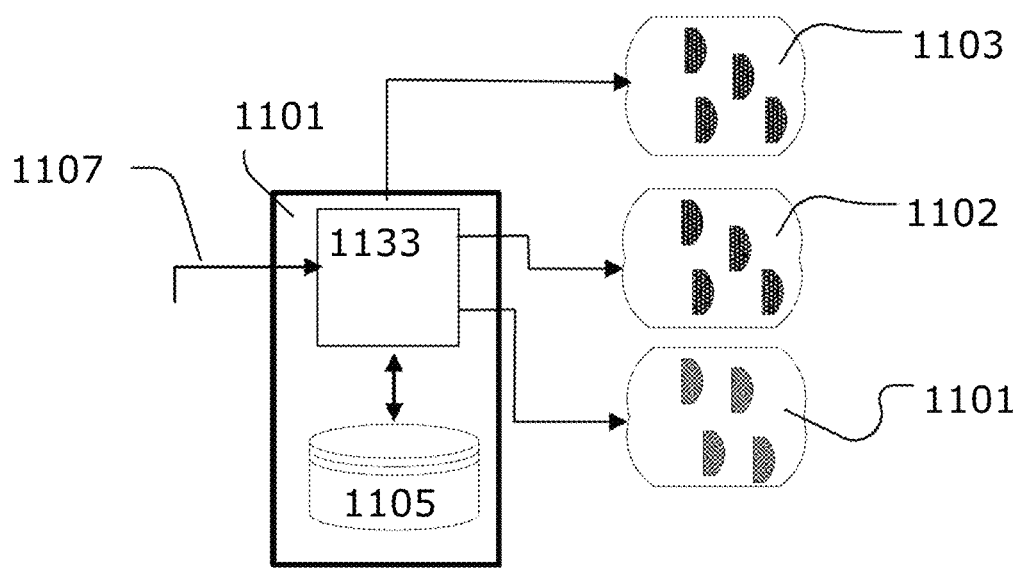
FIG. 11 shows a schematic illustration of a controlling scheme of an embodiment of an illumination device

FIG. 11 show a schematic illustration of a controlling scheme of an embodiment of an illumination device. More particularly, FIG. 11 illustrates a block diagram of an embodiment of the illumination device according to various embodiments. The illumination device comprises a control unit 1101 comprising a processor 1103 and a memory 1105. The first group of light sources 1101 and the second group of light sources 1102 (and optionally the third group of light sources 1103) are connected to the control unit 1101 and is arranged according to one or more embodiments. The processor acts as controlling means and is adapted to control the first group 1101 of light sources and the second group 1102 of light sources individually (and furthermore optionally arranged for controlling the third group of light sources 1103 individually) meaning the processing means can control one of the groups of light sources without controlling the other group of light sources. The controlling can for instance adapted to control the color and/or intensity of the light sources and can be based on any type of communication signals known in the art of lightning e.g. PWM, AM, FM, binary signals etc. The first 1101 and second 1102 group of light sources array can thus be controlled individually and independently of each other can thus be treated as two individually and independently groups of light sources.

In one embodiment the controlling means is adapted to control the first group of light sources 1101 based on an input signal 1107 indicative of a first target color of the first group of light sources. The input signal 1107 can be any signal capable of communication parameters and can for instance be based on one of the following protocols USITT DMX 512, USITT DMX 512 1990, USITT DMX 512-A, DMX-512-A including RDM as covered by ANSI E1.11 and ANSI E1.20 standards or Wireless DMX. ACN designates Architecture for Control Networks; ANSI E1.17-2006).

In one embodiment the controlling means is adapted to control the first group of light sources based on an input signal indicative of a first target color of the first group of light sources. The input signal can for instance be indicative of a first target color can be any parameter defining the color of the light that the first group light sources shall generate, for instance RGB values, color coordinates in color maps etc. The controlling means can be adapted to control the second group of light sources based on the input signal indicative of the first target color of whereby the second group of light sources can be adapted generate substantial the same color as the color generated by the first group of light sources. However, it is also possible to integrate a color scheme such that the color of the second array is adjusted such that the color of the second group of light sources is different but aesthetic matches each other according to a predetermined color scheme. The input signal can also be indicative of a second target color and the color of the second group of light sources can be controlled based on this second target color parameter. The skilled person realizes that the illumination device also can comprise a third group 1103 of light sources. This group can be controlled in similar manners as the two other groups of light sources. The third group of light sources 1103 can function as background lighting, such as with own DMX control and both color and intensity can be varied independently of the first group of light sources 1101 and/or the second group of light sources 1102.

Figure 12:
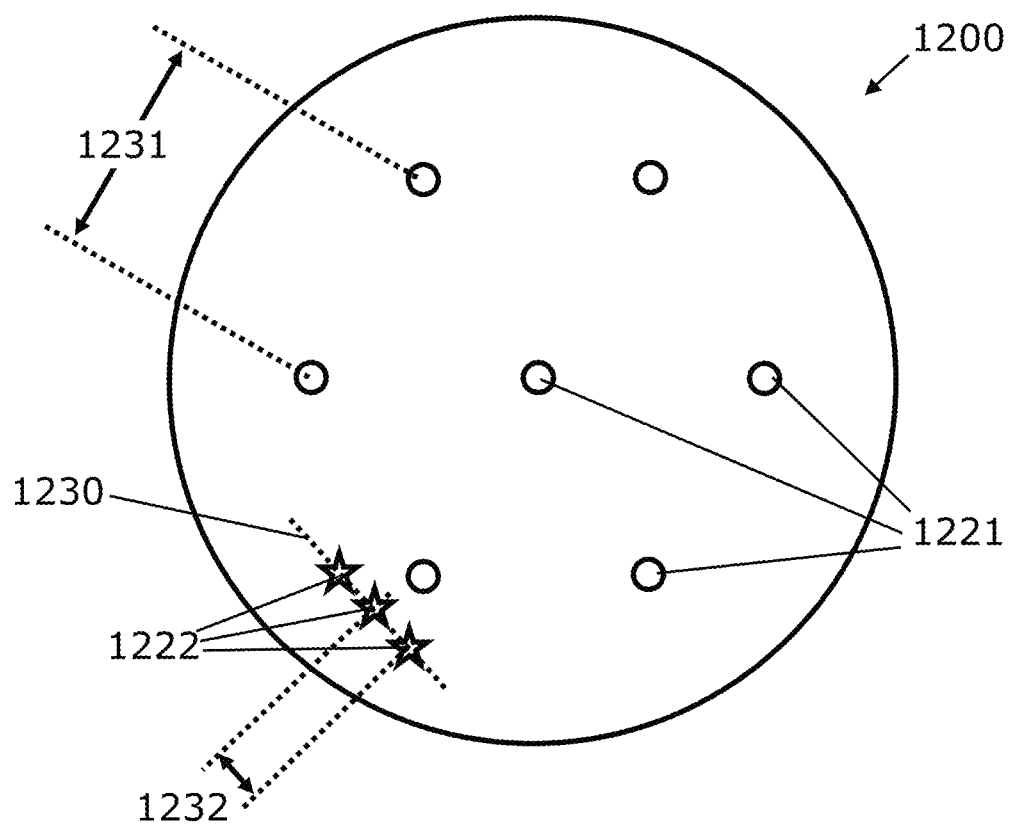
FIG. 12 shows a schematic illustration of an embodiment wherein the elongated shape is given by an arrangement of light emitters within the second group of light sources, which arrangement forms a line.

FIG. 12 shows a schematic illustration of an embodiment of an illumination device 1200, which is similar to the embodiment and view of FIG. 2, except that the elongated shape is given by an arrangement of light emitters 1222 within the second group of light sources, which arrangement forms a line 1230. More particularly, FIG. 12 shows a front view of a part of an embodiment of an illumination device comprising seven non-elongated LED light sources within a first group of light sources 1221, 3 light sources (i.e., only 3 shown in figure, although there could be more) within a second group of light sources 1222.

The light sources in the second group of light sources 1222 are each non-elongated, but arranged so as to form a line, wherein a center-to-center distance 1232 (which in the present embodiment is 1 cm) between neighboring light sources within the second group of light sources is less than half (½ times) a minimum center-to-center distance 1231 (which in the present embodiment is 5 cm).

Although the present disclosure has been described in connection with the specified embodiments, it should not be construed as being in any way limited to the presented examples. The scope of the present invention is set out by the accompanying claim set. In the context of the claims, the terms "comprising" or "comprises" do not exclude other possible elements or steps. Also, the mentioning of references such as "a" or "an" etc. should not be construed as excluding a plurality. The use of reference signs in the claims with respect to elements indicated in the figures shall also not be construed as limiting the scope of the invention. Furthermore, individual features mentioned in different claims, may possibly be advantageously combined, and the mentioning of these features in different claims does not exclude that a combination of features is not possible and advantageous.

What is claimed is:

1. An illumination device comprising:
    a plurality of light sources arranged in at least:
        i. one or more first light sources, and
        ii. one or more second light sources comprising one or more light emitting strings, wherein the one or more first light sources and the one or more second light sources are each individually controllable; and
    one or more light collectors, each being arranged for collecting light from a light source from the one or more first light sources and for converting the collected light into one or more light beams,
    wherein:
        the one or more first light sources and the one or more second light sources are both arranged for emitting light from a first side of the one or more light collectors,
        the light emitting strings are visible through the one or more light collectors, and
        the illumination device is arranged so that light emitted from the one or more second light sources through the one or more light collectors generates a pattern of one or more imageable or observable elongated elements outside the illumination device on a second side of the one or more light collectors, wherein the second side is opposite the first side of the one or more light collectors.

2. The illumination device of claim 1, wherein the one or more light emitting strings comprise one or more light guides illuminated from one or more emitters within the one or more second light sources.

3. The illumination device of claim 1, wherein the one or more light emitting strings are LED filament strings.

4. The illumination device of claim 1, wherein:
    the one or more first light sources comprise a plurality of first light sources;
    the one or more second light sources comprise a plurality of second light sources; and
    the one or more imageable or observable elongated elements are given by at least one of:
        one or more coherent elongated elements, or
        an arrangement of light sources within the plurality of second light sources, which arrangement forms a line,
        wherein a center-to-center distance between neighboring light sources within the plurality of second light sources is less than half a minimum center-to-center distance between light sources within the plurality of first light sources.

5. The illumination device of claim 1, wherein the illumination device is arranged so that each light source within the one or more first light sources is paired with a corresponding light collector of the one or more light collectors.

6. The illumination device of claim 1, wherein the one or more light collectors are gathered in a lens assembly.

7. The illumination device of claim 1, further comprising a backdrop arranged so that the one or more second light sources is placed between the one or more light collectors and the backdrop.

8. The illumination device of claim 7, wherein the backdrop has variations in at least one of texture or optical properties.

9. The illumination device of claim 8, wherein the backdrop is designed with circular V-grooves being concentrically arranged with respect to an optical axis of at least one light collector within the one or more light collectors.

10. The illumination device of claim 8, wherein the illumination device further comprises one or more third light sources, the one or more third light sources being arranged for backlighting the backdrop.

11. The illumination device of claim 10, wherein the backdrop is at least one of: (1) placed between the one or more third light sources and the one or more light collectors, or (2) is substantially translucent and diffuses the light.

12. The illumination device of claim 1, wherein the illumination device is a moving head.

13. The illumination device of claim 1, wherein the one or more light collectors comprise one or more lenses.

14. The illumination device of claim 1, wherein the pattern comprising the one or more imageable or observable elongated elements is a line pattern.

15. A method for illumination using a lighting device comprising a plurality of light sources, the method comprising:
    emitting light from at least one of one or more first light sources or one or more second light sources,
    wherein:
        the lighting device comprises:
            the plurality of light sources arranged in at least:
                i. the one or more first light sources, and
                ii. the one or more second light sources comprising one or more light emitting strings, wherein the one or more first light sources and the one or more second light sources are each individually controllable; and one or more light collectors, each being arranged for collecting light from a light source from the one or more first light sources and for converting the collected light into one or more light beams, the one or more first light sources and the one or more second light sources are both arranged for emitting light from a first side of the one or more light collectors, the light emitting strings are visible through the one or more light collectors, and the lighting device is arranged so that light emitted from the one or more second light sources through the one or more light collectors generates a pattern of one or more imageable or observable elongated elements outside the lighting device on a second side of the one or more light collectors, wherein the second side is opposite the first side of the one or more light collectors.

16. The method of claim 15, wherein the one or more light collectors comprise one or more lenses.

17. The method of claim 16, wherein the pattern comprising the one or more imageable or observable elongated elements is a line pattern.

* * * * *